July 25, 1933.   A. W. SWANSON   1,919,812
CLAMPING DEVICE
Filed Feb. 5, 1931   2 Sheets-Sheet 1
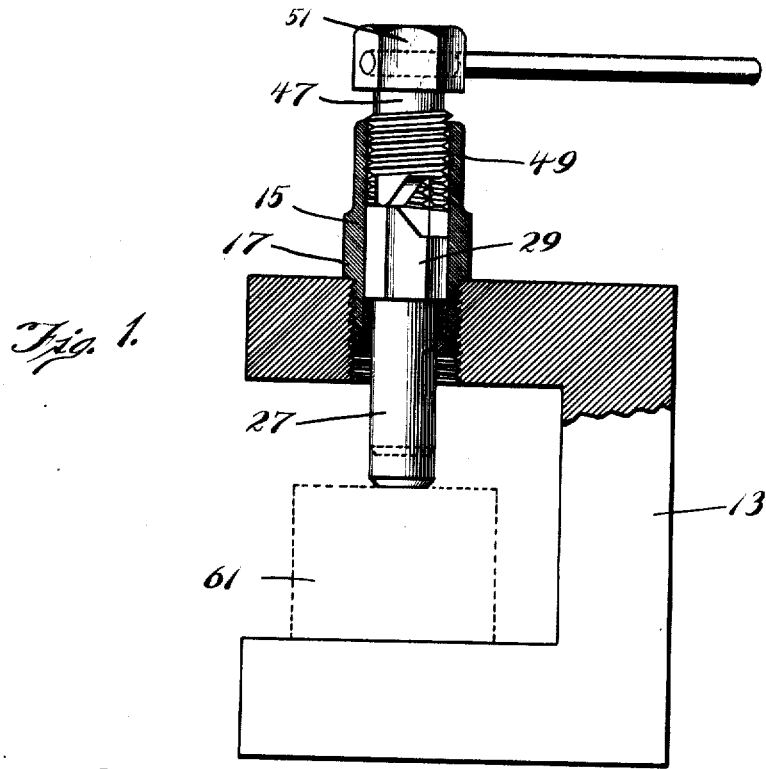
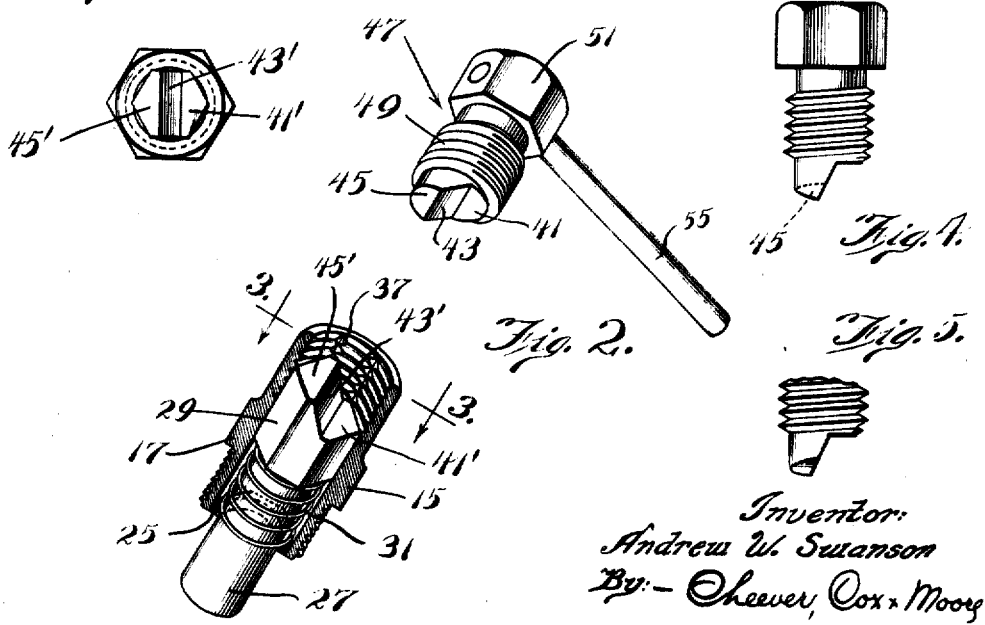
Inventor:
Andrew W. Swanson
By:— Cheever, Cox & Moore
Attys

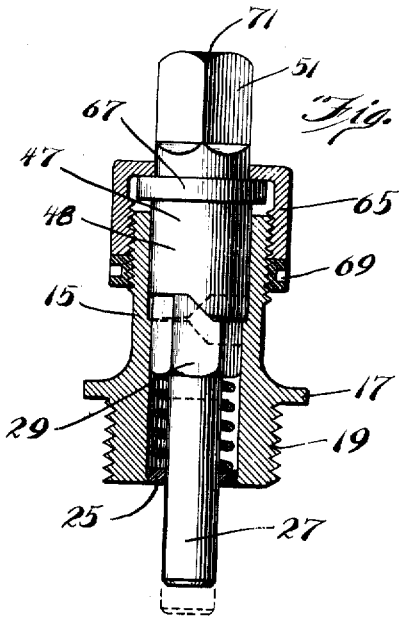
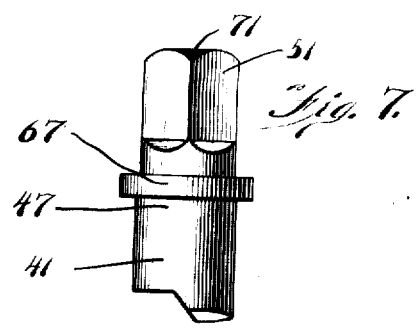
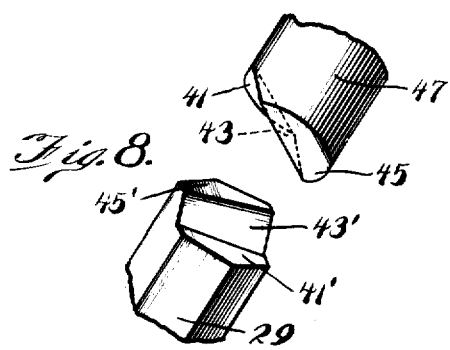
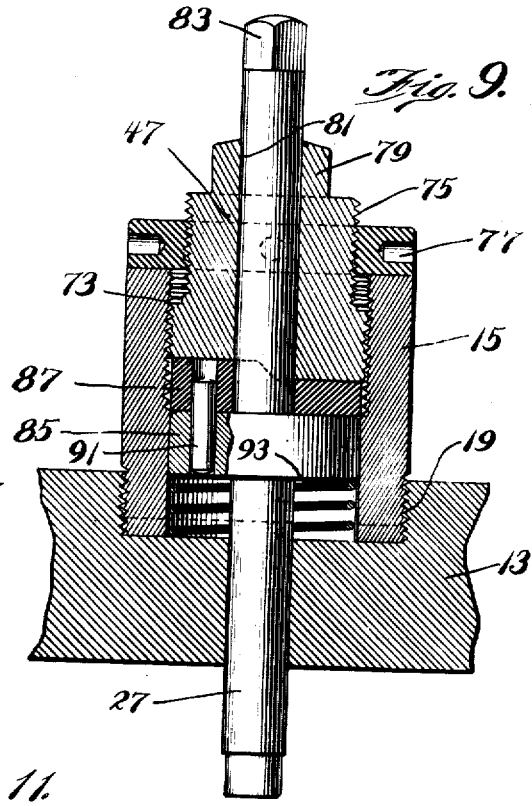
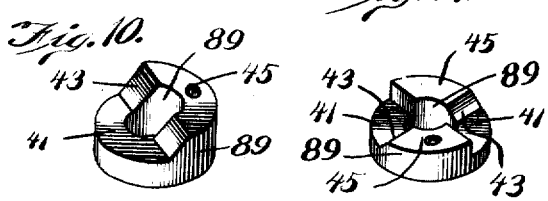

Patented July 25, 1933

1,919,812

UNITED STATES PATENT OFFICE

ANDREW W. SWANSON, OF CHICAGO, ILLINOIS, ASSIGNOR TO ILLINOIS TOOL COMPANY, OF CHICAGO, ILLINOIS, A CORPORATION OF ILLINOIS

CLAMPING DEVICE

Application filed February 5, 1931. Serial No. 513,635.

My invention relates in general to clamping devices and has more particular reference to clamping screws for use in work holding fixtures such as jigs, milling fixtures and the like, the main object of the invention being to provide a clamp for quick action through the initial portions and slow action through the remainder of its stroke, whereby to quickly and easily obtain clearance when positioning and removing the object to be clamped, while at the same time providing greater final clamping pressure than can be obtained during the more rapid portions of the movement of the clamping member.

My present invention includes improvements on the invention shown in my copending application, Serial Number 473476, filed August 6, 1930.

Among the other important objects of the invention is to provide a clamping device which can be readily applied as a unit to a jig or other fixture, and which may as readily be demounted therefrom; to provide a clamping device of simple, rugged construction in which the several parts may be inexpensively manufactured; to provide a device of the class described having manually adjustable means to position the clamping member in clamping position.

Another important object resides in the novel method of mounting a clamping device in a jig or other fixture which includes the provision of a threaded aperture in the jig and a housing for the clamping device adapted to thread into the perforation in the jig. Numerous other objects and advantages of the invention will be understood from the following description, which, taken in connection with the accompanying drawings, discloses a preferred embodiment of my invention.

Referring to the drawings:

Figure 1 is a side perspective view of a device embodying my present invention, parts of the device being shown in section to reveal the details of construction;

Figure 2 is an exploded view of the clamping unit of Figure 1, the several parts being shown in perspective;

Figure 3 is a perspective view of a modified part which may be employed to advantage in the clamping unit of Figure 2, to modify the clamping action;

Figures 4 and 5 are perspective views illustrating a modification of the device illustrated in Figures 1, 2 and 3;

Figure 6 is a view in vertical section showing a clamping device embodying my invention;

Figure 7 is a perspective view of a part of the device shown in Figure 6;

Figure 8 is a perspective exploded view of parts shown in Figure 6;

Figure 9 is a view in vertical section showing a device embodying my invention; and Figures 10 and 11 are perspective views illustrating modifications of a part of the device shown in Figure 9.

To illustrate my invention I have shown on the drawings several devices embodying my invention. Each device comprises a clamping member 27, means 15 comprising a frame to support the clamping member in operative position and a driving member 47. The clamping member is or may normally be urged into contact with the driving member by resilient means, preferably a spring 31 operating between the support means 15 and the clamping member. The engaging faces of the clamping and driving members are provided with co-operating means having sloping sides providing cam means for quickly projecting the clamping member away from the driving member when the parts are relatively rotated.

The engaging faces of the clamping and driving members are also provided with additional cam means for imparting a relatively slow projecting movement in the clamping member upon propelling the relatively rotating parts beyond that required for the initial projection. In this manner the devise will be quickly arranged in clamping position during the initial relative rotation of the part while the slower final clamping action may be imparted without a great deal of additional relative movement of the parts.

In the devices illustrated in Figures 1 through 8, relative rotation is imparted by turning the driving member 47 in the frame 15 while the clamping member 27 is held from rotation in the frame.

In the device shown in Figure 9, however, the clamping member is turned while the driving member is held from rotation as by means of a lock nut, advantageous features of which will be hereinafter more fully described.

The devices illustrated in Figures 1 through 5, comprise a clamping member 27, a frame 15 for supporting the clamping member in operative position and a driving member 47. The driving member has screw threaded connection 49 with the frame whereby upon rotation of the driving member in the frame, it will be propelled toward or away from the clamping member. The clamping member 27 is provided with a head 29 formed for non-rotative yet sliding movement within the frame 15 which is provided with means comprising longitudinal grooves 37 or other non-circular configuration to non-rotatively receive the non-circular head of the clamping member. The head of the clamping member is or may be normally urged to connect with the lower end of the driving member by resilient means, preferably a spring 31 operating between the lower end of the frame and the lower end of the head 29 to urge the same upwardly in the frame and to co-operating engagement with the lower end of the driving member.

To facilitate rotation of the driving member, it may be provided with a head 51 of non-circular, preferably hexagonal, configuration, to facilitate engagement as by a wrench or handle. The engaging ends of the clamping and driving members are provided with co-operating cams, the contacting ends of each member comprising low surfaces 41 on one side extending in a plane substantially normal to the axis of the member, intermediate centrally inclined surfaces 43 extending across the end of the member at an angle (a 45° angle is preferred) to an axis of the member and relatively high surfaces 45 extending substantially at right angles to the axis of the member. For the sake of clarity, the low, intermediate and high surfaces of the members are designated respectively 41, 43, and 45 while the corresponding surfaces of the clamping members are designated 41', 43' and 45'.

In operation the co-operating cam portions of the clamping and driving members are housed in the frame 15 in interfitting relationship when the clamping member is in retracted position. That is to say, the high portions 45, 45' engage the low portions 41, 41' and the inclined portions 43, 43' are also in engagement, the clamping member normally urged upwardly against the driving member by the action of the spring 31. Upon rotation of the driving member, the cam action between the sloping sides 43, 43' will cause the rapid initial projection of the clamping members away from the driving member toward clamping position. This projection will be equal to the vertical spacement of the surfaces 41 and 45. Further rotation of the member 49 will result in the relative slow projection of the clamping member 27 as the surface 45 of the driving member slides around the surface 45' of the clamping member. During this movement, the plunger will be slowly advanced by the advancement of the screw 49 in the threaded portion of the frame, this slow clamping projection being substantially equal to one-half of the pitch of the screw 49. It will be apparent that if the clamping device is previously adjusted to a position in which the initial rapid movement of the clamping member will bring it against an object 61 to be clamped, the secondary slow movement imparted to the clamping member by the rotation of the screw, will result in a strong tight clamping action. If the clamping action is not sufficiently tight, all that is necessary is to continue the rotation of the driving member. The parts will re-assume nested position in which the clamping member is retracted but, when the cam surfaces 43, 43' operate, the clamping member will be projected to clamping position at a distance greater than the furthest projection by an amount equal to the pitch of the threads 49. Of course, if the member 47 is continuously rotated the parts will assume nested position which will be once during each revolution of the driving member so that the clamping member will assume retracted position under the influence of the spring. However, the clamping member will be gradually advanced (an amount equal to the pitch of the screw 49) for each complete rotation of the driving member until the clamping member is in clamping position at which time the normal operation of the clamping member will occur as previously described.

If desired, either or both of the surfaces 45 and 45', the co-operation of which imparts the slow clamping movement to the member 27, may be formed at an angle so that the throw of said slow clamping movement may be increased an amount greater than one-half the pitch of the threads 49 by the pitch of the surfaces 45 and 45' and I have illustrated this in Figure 4 of the drawings by showing the clamping member 47 in which the surface 45 is given an inclination. In Figure 5, the surface 45 is inclined in the reversed direction so that the action of cam surfaces 45, 45' will act differently with respect to the threads 49 so that the clamping member 27 will be projected more slowly than would be the case if the clamping movement was imparted slowly by the pitch of the threads 49. The same effect may be accomplished by warping the surfaces 45 to provide a screw thread configuration. The surfaces 45 may be formed to assist the action of the threads 49 in projecting the clamping member or may be formed to lessen the effect of the threads by reversing the pitch of the plane 45. The angle at which the plane 45 is formed, could even be made in such a way that the plunger is actually retracted while the screw threads are being rotated to advance the plunger, but this, of course, would be of no advantage in the clamping device.

What I have actually done by warping the surface 45 is to provide means operating cumulatively or differentially with the threads 49 to impart longitudinal movement in the clamping member 27 after the initial rapid projection is complete.

I may also employ the warping of the surfaces 45, 45' without the threads 49 to impart longitudinal clamping movement in the clamping member and the devices shown in Figures 6, 7, and 8 illustrate such an arrangement. In these devices the driving member is merely mounted for rotation in the frame 15 without being threaded therein, the final slow clamping action being accomplished by suitably warping the surfaces 45 and/or 45'.

Figures 6, 7, and 8 disclose a clamping device comprising a clamping member 27, a frame 15 for supporting the clamping member in operative position and a driving member 47 rotatably supported in the frame, the frame is externally threaded at its lower end as at 19 and is provided with a shoulder 17 to facilitate the detachable connection of the clamping device as in a jig or fixture. The frame also at its upper end is provided with external screw threads to threadingly receive a cover 65 having a central opening in its top to receive and rotatably support the driving member 47. The driving member is also provided with an annular ridge 67 adapted to engage behind the cover 65, a portion 71 extending upwardly through the center perforation of the cover and being formed with a non-circular end 51 facilitating engagement as by a wrench or handle whereby the driving member may be turned. The co-operation of the cover 65 with the ridge or flange 67 retains the driving member in the frame and the position of the driving member in the frame may be adjusted longitudinally by rotating the cover 65. A lock nut 69 is or may be provided to secure the cover in its adjusted position on the frame. The driving member 47 is formed with smooth cylindrical external portions 41 below the flange 67 and the upper portions of the frame are formed internally to snugly receive the cylindrical portion 41 of the driving member. The lower portions of the frame also are formed with a non-circular bore adapted to non-rotatably yet slidingly receive the formed non-circular head 29 of the clamping member 27 and a spring 31 is interposed between the abutment 25 at the lower end of the frame and head 29 of the clamping member to normally urge the same upwardly and against the lower end of the driving member. The inter-engaging ends of the clamping member and driving member are formed with cam means comprising surfaces 41—41', 43—43', 45—45' similar to the corresponding surfaces described in the embodiment illustrated in Figures 1 through 5. In the present embodiment however, the surfaces 45 and/or 45' are warped as described in connection with the modifications illustrated in Figures 4 and 5 so that when the driving member is rotated to slide the surface 45 across the surface 45', the slow clamping movement, heretofore referred to, will be imparted in the clamping member after the same has been initially projected to clamping position by the cam action set up between the surfaces 43 and 43' by the relative rotation of the driving and clamping members. It will be obvious that the adjustment of the device so that the clamping member will be initially moved to clamping position will, in the present embodiment illustrated in Figures 6, 7, and 8, be accomplished by adjusting the nut 65 on the frame whereas the same adjustment illustrated in the embodiment in Figures 1 through 5, is accomplished by continual rotation of the clamping member.

In Figures 9, 10 and 11 of the drawings, I have shown a device in which the relative rotation between the clamping and driving members is accomplished by holding the driving member non-rotatably in the frame while rotating the clamping member. The adjustment of the parts is accomplished by shifting the driving member axially in the frame. The device shown in Figures 9, 10 and 11 comprises a frame 15 provided at its lower end with screw threads 19 to facilitate the mounting of the device as in a jig 13 or other support. The frame 15 is provided internally with screw threads 73 at its upper portion which threads receive the lower threaded extremity of a driving member 47. The driving member is provided with a portion of decreased diameter which portion is provided with additional screw threads 75 formed to receive the internal threads of a lock nut 77. The upper end of the driving member is provided with a non-circular portion 79 whereby to engage a wrench or similar device to facilitate rotation of the driving member in the frame, whereby to adjust the same longitudinally in the frame by operation of the screw thread 73. The driving member is provided with an axial bore 81 extending completely through the part. The clamping member 27 comprises a shaft, the lower portion of which is formed to engage the work piece to be clamped; the upper portion of the shaft extends through the bore 81 of the driving member and has an upper projecting end 83 squared, or otherwise formed, to receive a wrench, handle or similar device whereby to facilitate the turning of the clamping member. The shaft forming the clamping member is also provided with cam means below the lower end of the driving member which also is formed with co-operating cam means. In the present instance, the clamping member is provided with detachable cam means 87 whereby the operating characteristics of the clamping device might be changed at will. The clamping member is provided with a cylindrical enlargement 85 sliding in the frame 15 below the driving member and a cam member 87 having a central bore 89 adapted to receive the upper portion of the shaft forming the clamping member and having a lower flat surface adapted to rest upon the block 85 and further having its upper surfaces formed with cam portions similar to the portions 41', 43' and 45' heretofore described in connection with the previously mentioned modifications. The clamping member 89 may be formed with a single set of co-operating cams as shown in Figure 10 of the drawings or with two (2) or more sets of cams as shown in Figure 11. A pin 91 or other similar means is or may be provided to lock the cam 87 against rotation on the driving member. Spring means 93 also is or may be interposed between the lower end of the frame and the block 85 to normally urge the cam member 87 upwardly against the driving member 49. In operation the lock nut 77 is loose and the driving member 47 adjusted in the frame to a position in which, upon turning the clamping member, the same will be projected by the cam parts to clamping position. The driving member is secured in adjusted position by turning the clamping nut 77 against the upper end of the frame 15. If now the clamping member is turned as by means of a handle attached to the upper formed end 83, the clamping member will be projected initially to final clamping position by the inter-locking cam members 41', 43' and 45'. Continued rotation of the clamping member will cause the final slow tight clamping movement imparted by the co-operation of the surfaces 45, 45', either or both of which are or may be warped in a manner heretofore described in connection with the previously mentioned embodiments of the invention.

It is thought that the invention and numerous of its attendant advantages will be understood from the foregoing description and it is obvious that numerous changes may be made in the form, construction and arrangement of the several parts without departing from the spirit or scope of the invention or sacrificing any of its attendant advantages, the form herein described being a preferred embodiment for the purpose of illustrating the invention.

I do not herein claim the broad or specific subject matter of invention described in and claimed in my aforesaid copending application, Serial No. 473,376, filed August 6, 1930.

Having thus described my invention what I claim as new and desire to secure by Letters Patent is:

1. In a clamping device, a frame, a clamping member slidingly supported in said frame for axial movement therein, a driving member threaded in said frame, whereby rotation of the driving member will cause axial adjustment thereof in the frame, means to lock the driving member in adjusted position and co-operating cam means including a fast cam portion and a slow cam portion operable upon relative rotation between the driving and clamping members to propel the clamping member axially in said frame with an initial rapid and laterly slower movement.

2. In a clamping device, a frame, a clamping member slidingly supported in said frame for axial movement therein, a driving member mounted in said frame, means providing a threaded connection between said driving member and said frame whereby relative rotation of said means will impart axial movement in said driving member with respect to the frame, said driving and clamping members having co-operating cam means for imparting axial movements in said clamping member in response to relative rotation between the clamping and driving members, said cam means having a portion of greater pitch than the pitch of the threaded means connecting the driving member in the frame.

3. In a clamping device, a frame, a clamping member supported in said frame, a driving member mounted in said frame, means providing a threaded connection between one of said members and said frame, said driving and clamping members having co-operating cam means for imparting axial movement in the clamping member in response to the relative rotation between the clamping and driving members, said cam means having a portion of greater pitch than the pitch of the threaded means aforesaid.

4. In a clamping device, a frame, a clamping member slidingly supported in the frame for axial movement therein and driving means for said clamping member carried in said frame, said driving means including cooperating parts forming a threaded connection with the frame and a cam-like driving connection with the clamping member, said cam-like connection having a pitch greater than that of the threaded connection aforesaid, whereby upon actuation of the driving means, said clamping member will be initially rapidly advanced in the frame toward clamping position through the action of the cam-like connection of increased pitch and will then be more slowly moved to clamping position through the operation of the threaded means.

5. In a clamping device, a frame, a clamping member slidingly supported in said frame for axial movement therein, a driving member mounted in said frame, means for adjusting the driving member axially in said frame, means to lock the driving member in adjusted position and co-operating cam means including a fast cam portion and a slow cam portion operable upon relative rotation between the parts to propel the clamping member axially in said frame with an initial rapid and laterly slower movement, the clamping member being splined in the frame and the driving member being free for rotation in the frame.

6. In a clamping device, a frame providing a channel having a non-circular, cross-sectional configuration, a clamping member supported in said frame and having a portion of non-circular, cross-sectional configuration conforming with the configuration of the channel and slidable longitudinally therein, a driving member mounted in said frame, threaded means connecting the driving member to the frame, said driving and clamping means having cooperating cam means for providing axial movement in the clamping member in response to the relative rotation between the clamping members, said cam means having a pitch greater than that of the threaded means aforesaid.

7. In a clamping device, a frame, a clamping member slidingly supported in the frame for axial movement therein, said clamping member and frame having cooperating means permitting relative longitudinal movement of the clamping member in the frame while preventing relative rotation of the member in the frame and driving means for said clamping member, said driving means including cooperating parts forming a threaded connection with the frame and a cam-like driving connection with the clamping member, said cam-like connection having a pitch greater than that of the threaded connection aforesaid, whereby, upon actuation of the driving means, said clamping member will be initially rapidly advanced in the frame toward clamping position through the action of the cam-like driving connection and will then be more slowly moved toward clamping position through the operation of the threaded means.

8. In a clamping device, a frame having an axial bore, said bore being of polygonal cross-sectional configuration, a clamping member axially slidable in the bore of said frame, said clamping member having a portion corresponding in shape and snugly fitting within said bore, a driving member mounted in said frame and cooperatively associated with the clamping member, means providing a threaded connection between said driving connection and said frame whereby relative rotation of said means will impart axial movement to said driving member with respect to the frame, said driving and clamping means having cooperating cam means for imparting axial movement to said member in said frame in response to relative rotation between the clamping and driving members, said cam means having a portion of greater pitch than the pitch of the threaded means connecting the driving member to the frame.

9. In a clamping device, a frame, a clamping member supported in said frame, a driving member mounted in said frame, means providing a threaded connection between one of said members and said frame, said driving and clamping members having cooperating cam means for imparting axial movement in the clamping member in response to the relative rotation between the clamping and driving members, said cam means having a portion of greater pitch than the pitch of the threaded means aforesaid, said clamping member being normally urged in the frame toward the driving member.

10. In a clamping device, a frame, a clamping member supported in said frame, a driving member mounted in said frame, means providing a threaded connection between one of said members and said frame, said driving and clamping members having co-operating cam means for imparting axial movement in the clamping member in response to the relative rotation between the clamping and driving members, said cam means having a portion of greater pitch than the pitch of the threaded means aforesaid and resilient means normally urging the clamping member into yielding contact with the driving member.

11. In a clamping device, a substantially cylindrical housing having an axial bore provided with internal threads, a plunger non-rotatably mounted for axial projection in said housing, an actuating member for said plunger, said member being externally threaded to engage the internal threads of said bore, said plunger and actuating member having interengaging cam surfaces adapted, when the actuating member is rotated to initially project the clamping plunger rapidly in the housing toward clamping position and thereafter, through the operation of the threaded connection between the actuating member and the housing to provide the plunger with a slower clamping movement, means for rotating the actuating member in the housing and spring means interposed between the housing and plunger for normally urging same to contact with the actuating member.

12. In a clamping device, a fixture having an internally threaded socket, a frame having external threads for detachably securing said frame in said socket, a clamping member supported in said frame, a driving member mounted in said frame, means for providing a threaded connection between one of said members and said frame, said driving and clamping member having cooperating cam means for imparting axial movement in the frame to the clamping member in response to the relative rotation between the clamping and driving members, said cam means having a portion of greater pitch than the threaded means aforesaid whereby to project the clamping member to engage a work piece to be clamped and to press said work piece against a remote piece of the fixture.

ANDREW W. SWANSON.

CERTIFICATE OF CORRECTION.

Patent No. 1,919,812.            July 25, 1933.

ANDREW W. SWANSON.

It is hereby certified that the name of the assignee in the above numbered patent was erroneously described and specified as "Illinois Tool Company", whereas said name should have been described and specified as "Illinois Tool Works", as shown by the records of assignments in this office; and that the said Letters Patent should be read with this correction therein that the same may conform to the record of the case in the Patent Office.

Signed and sealed this 29th day of August, A. D. 1933.

M. J. Moore.

(Seal)            Acting Commissioner of Patents.

the operation of the threaded connection between the actuating member and the housing to provide the plunger with a slower clamping movement, means for rotating the actuating member in the housing and spring means interposed between the housing and plunger for normally urging same to contact with the actuating member.

12. In a clamping device, a fixture having an internally threaded socket, a frame having external threads for detachably securing said frame in said socket, a clamping member supported in said frame, a driving member mounted in said frame, means for providing a threaded connection between one of said members and said frame, said driving and clamping member having cooperating cam means for imparting axial movement in the frame to the clamping member in response to the relative rotation between the clamping and driving members, said cam means having a portion of greater pitch than the threaded means aforesaid whereby to project the clamping member to engage a work piece to be clamped and to press said work piece against a remote piece of the fixture.

ANDREW W. SWANSON.

CERTIFICATE OF CORRECTION.

Patent No. 1,919,812.

July 25, 1933.

ANDREW W. SWANSON.

It is hereby certified that the name of the assignee in the above numbered patent was erroneously described and specified as "Illinois Tool Company", whereas said name should have been described and specified as "Illinois Tool Works", as shown by the records of assignments in this office; and that the said Letters Patent should be read with this correction therein that the same may conform to the record of the case in the Patent Office.

Signed and sealed this 29th day of August, A. D. 1933.

M. J. Moore.

(Seal)

Acting Commissioner of Patents.

CERTIFICATE OF CORRECTION.

Patent No. 1,919,812.                                          July 25, 1933.

ANDREW W. SWANSON.

It is hereby certified that the name of the assignee in the above numbered patent was erroneously described and specified as "Illinois Tool Company", whereas said name should have been described and specified as "Illinois Tool Works", as shown by the records of assignments in this office; and that the said Letters Patent should be read with this correction therein that the same may conform to the record of the case in the Patent Office.

Signed and sealed this 29th day of August, A. D. 1933.

M. J. Moore.

(Seal)                                                  Acting Commissioner of Patents.